United States Patent
Hashimoto

(10) Patent No.: US 6,721,258 B1
(45) Date of Patent: Apr. 13, 2004

(54) OPTICAL DEVICE FOR SUPER-RESOLUTION

(75) Inventor: Nobuyuki Hashimoto, Iruma (JP)

(73) Assignee: Citizen Watch Co., Ltd., Tokyo (JP)

( * ) Notice: Subject to any disclaimer, the term of this patent is extended or adjusted under 35 U.S.C. 154(b) by 127 days.

(21) Appl. No.: 10/018,566

(22) PCT Filed: Jun. 21, 2000

(86) PCT No.: PCT/JP00/04066

§ 371 (c)(1),
(2), (4) Date: Dec. 20, 2001

(87) PCT Pub. No.: WO00/79331

PCT Pub. Date: Dec. 28, 2000

(30) Foreign Application Priority Data

Jun. 21, 1999 (JP) ............................................. 11-173944

(51) Int. Cl.⁷ ................................................. G11B 7/00
(52) U.S. Cl. .............................. 369/112.16; 369/112.17; 369/118
(58) Field of Search ........................ 369/112.02, 112.16, 369/112.17, 112.18, 112.19, 112.22, 118, 44.24

(56) References Cited

U.S. PATENT DOCUMENTS 5,600,614 A   2/1997   Katayama

FOREIGN PATENT DOCUMENTS

JP   6-124477 A   5/1994

Primary Examiner—Paul W. Huber
(74) Attorney, Agent, or Firm—Finnegan, Henderson, Farabow, Garrett & Dunner, L.L.P.

(57) ABSTRACT

The present invention is directed to the provision of an optical device that can easily eliminate only side lobes or side lobe components from a super-resolution optical spot. The optical device comprises: blocking means for blocking a portion of first linearly polarized light; a polarizing beam splitter for transmitting the first linearly polarized light therethrough, and for reflecting second linearly polarized light whose plane is oriented at right angles relative to the first linearly polarized light; a quarter-wave plate for converting the first linearly polarized light into first circularly polarized light and the first circularly polarized light into the first linearly polarized light, while converting second circularly polarized light, whose plane is rotating in a direction opposite to the first circularly polarized light, into the second linearly polarized light; a first converging lens for forming an optical spot on the optical disk, and for allowing reflected light caused by the optical spot by reflection from the optical disk to pass therethrough in a backward direction; and a second converging lens for focusing a beam of light reflected by the polarizing beam splitter onto a light detector.

15 Claims, 3 Drawing Sheets

OPTICAL DEVICE FOR SUPER-RESOLUTION

This application is a 371 of PCT/JP00/04066, filed Jun. 21, 2000.

TECHNICAL FIELD

The present invention relates to an optical super-resolution technique for improving resolution beyond the theoretical resolution limit of an optical device well-corrected for aberration. The invention also relates to a technique for eliminating side lobes associated with super resolution. More particularly, the invention relates to a technique for improving the resolution of an optical pickup for an optical disk.

BACKGROUND ART

The theoretical resolution limit of an optical device will be briefly explained. In an optical device designed to be substantially free from aberration in geometrical optics, the spot image it produces is focused as an infinitely small optical spot. In reality, however, the optical spot exhibits a finite degree of spreading because of the diffraction arising as a consequence of the wave nature of light. Here, when the numerical aperture of the optical device, which contributes to the focusing or converging of the spot, is denoted by NA, the physical definition of the optical spot spreading is given by the formula $k \times \lambda \div NA$, where $\lambda$ is the wavelength of light, and k is a constant that depends on the optical device and usually takes a value between 1 and 2. The numeral aperture NA is, in general, proportional to D/f which is the ratio of the effective entrance pupil diameter, D, of the optical device (usually, the effective beam diameter) to the focal length, f, of the optical device.

Therefore, if the theoretical resolution of the optical device is to be increased, that is, if the optical spot is to be focused to a smaller diameter, either light of a shorter wavelength should be used or the numerical aperture NA should be increased.

However, the wavelength of a commonly used laser light source is 780 nm or 650 nm. In recent years, a laser light source with a wavelength of 410 nm has been developed, but a laser light source having a wavelength of 380 nm or shorter is either difficult to achieve or expensive to implement.

On the other hand, as the numerical aperture NA of an optical device increases, it becomes increasingly difficult to design the optical device to be free from aberration in geometrical optics. Further, the focal depth of the optical device decreases with the square of the numerical aperture NA, while the coma of the optical device increases with the cube of the numerical aperture NA. Under the current circumstances, therefore, designing an optical device with a numerical aperture NA of about 0.7 or larger is either difficult to achieve or expensive to implement. It should also be noted that the usual optical materials used to construct optical devices are opaque to light at 380 nm and shorter wavelengths. As a result, optical devices using such optical materials have the disadvantage that light cannot be effectively utilized.

For the reasons stated above, there are limitations in increasing the theoretical resolution of the optical device by using light of shorter wavelength or by increasing the numerical aperture NA.

In view of this, an alternative technique for further improving the above-described theoretical resolution of the optical device is proposed in "O plus E" (No. 154, pp. 66–72, 1992). This technique uses a light blocking plate to block a portion of the effective beam of a super-resolution optical device and to thereby make the optical spot size 10 to 20% smaller than the theoretical limit of the optical device. This technique achieves an effect equivalent to increasing the numerical aperture NA of the optical device or making the wavelength of the light source shorter.

However, the above technique has had the problem that when an optical spot is formed by the super-resolution optical device, side lobes or relatively large peaks peculiar to super resolution appear on both sides of the spot, making the optical spot appear as if it had three peaks.

This phenomenon will be explained with reference to FIGS. 4 and 5. FIG. 4 is a schematic diagram of an optical device for explaining the principle of super resolution. First, the aperture of a converging lens 406 is blocked using a blocking mask 403 of radius r with its center at an optical axis 401. It is assumed here that the radius r of the blocking mask 403 is smaller than the radius of an effective beam 402. FIG. 4 shows a cross-sectional view of the optical device, but it should be noted that the actual optical device has a shape that is rotationally symmetrical about its optical axis 401.

Here, the optical spot 501 formed at point P, i.e., the focal point of the converging lens 406, will be considered. The optical spot 501 can be considered to be the result of subtracting an optical spot 503, which is formed by a beam blocked by the blocking mask 403, from an optical spot 502, which is formed by the entire effective beam 402. The optical spot 501 at point P, the optical spot 502 formed by the entire effective beam 402, and the optical spot 503 formed by the beam blocked by the blocking mask 403 are shown in FIG. 5.

As can be seen from FIG. 5, the optical spot 501 at point P in FIG. 4 is narrower than the optical spot 502 formed by the entire effective beam 402 in the center region (hereinafter called the main lobe 504), but has troughs (hereinafter called the side lobes 505) on both sides. In FIG. 5, the side lobes 505 are negative in value, and optically this means that the optical phase is shifted by 180 degrees compared with that of the positive portions, that is, the optical phase is reversed. However, these side lobes 505 also have light intensities. As a result, an optical spot appearing to have three peaks is formed at point P. In FIG. 5, complex amplitude is plotted along the vertical axis and the position along the horizontal axis.

An optical spot having such three peaks poses a problem when it is applied to an optical disk pickup. That is, the surface of an optical disk is also illuminated with the two peak portions appearing on both sides, and the reflected light is detected as noise. A method for overcoming this problem is described in "Optics" (Vol. 18, No. 12, pp. 691–692, 1989). This method proposes to selectively eliminate side lobes by using very fine slits in the light path. However, it has been extremely difficult to align the fine slits, because if the slit position is displaced, the main lobe is also blocked. Furthermore, adherence of dust to slit gaps has also been a problem. A further problem has been that diffraction of light occurs due to the presence of the slits.

Accordingly, it is an object of the present invention to provide an optical device that solves the above problems and that can easily eliminate only side lobes or side lobe components from a super-resolution optical spot.

It is another object of the invention to provide an optical device that can switch between super resolution and normal resolution by using a simple method.

DISCLOSURE OF THE INVENTION

To attain the above objects, the present invention provides the following configuration.

The optical device of the invention comprises: blocking means for blocking a portion of a first linearly polarized light; a polarizing beam splitter for transmitting the first linearly polarized light. therethrough, and for reflecting the second linearly polarized light whose plane is oriented at right angles relative to the first linearly polarized light; a quarter-wave plate for converting the first linearly polarized light into first circularly polarized light and the first circularly polarized light into the first linearly polarized light, while converting the second circularly polarized light, whose plane is rotating in a direction opposite to the first circularly polarized light, into the second linearly polarized light; a first converging lens for forming an optical spot on the optical disk, and for allowing reflected light from the optical disk to pass therethrough in a backward direction; and a second converging lens for focusing a beam of light reflected by the polarizing beam splitter onto a light detector.

In another aspect of the invention, the optical device comprises: a half-wave phase shift mask for shifting the phase of a portion of a first linearly polarized light by a half wavelength; a polarizing beam splitter for transmitting the first linearly polarized light therethrough, and for reflecting the second linearly polarized light whose plane is oriented at right angles relative to the first linearly polarized light; a quarter-wave plate for converting the first linearly polarized light into a first circularly polarized light and the first circularly polarized light into a first linearly polarized light, while converting the second circularly polarized light, whose plane is rotating in a direction opposite to the first circularly polarized light, into the second linearly polarized light; a first converging lens for forming an optical spot on the optical disk, and for allowing reflected light from the optical disk to pass therethrough in a backward direction; and a second converging lens for focusing a beam of light reflected by the polarizing beam splitter onto a light detector.

In a further aspect of the invention, the optical device comprises: an optically active device for converting a portion of a first linearly polarized light into a second linearly polarized light whose plane is oriented at right angles relative to the first linearly polarized light; a polarizing beam splitter for transmitting the first linearly polarized light therethrough, and for reflecting the second linearly polarized light whose plane is oriented at right angles relative to the first linearly polarized light; a quarter-wave plate for converting the first linearly polarized light into a first circularly polarized light and the first circularly polarized light into the first linearly polarized light, while converting a second circularly polarized light, whose plane is rotating in a direction opposite to the first circularly polarized light, into the second linearly polarized light; a first converging lens for forming an optical spot on the optical disk, and for allowing reflected light from the optical disk to pass therethrough in a backward direction; and a second converging lens for focusing a beam of light reflected by the polarizing beam splitter onto a light detector.

Preferably, the optical spot comprises a main lobe of the first circularly polarized light and a side lobe of the second circularly polarized light, and the reflected light comprises reflected light having the second circular polarization caused by the main lobe and reflected light having the first circular polarization caused by the side lobe.

Also preferably, the quarter-wave plate converts the reflected light of the main lobe into the second linearly polarized light and the reflected light of the side lobe into the first linearly polarized light.

Further preferably, the second converging lens focuses, on the light detector, the reflected light of the main lobe having the second linearly polarized light reflected by the polarizing beam splitter.

Preferably, the blocking means, the half-wave shift mask, or the optically active device is disposed between the optical spot forming means and the polarizing beam splitter.

ADVANTAGEOUS EFFECT OF THE INVENTION

Using simple configuration, the side lobe components peculiar to super resolution can be removed from the reflected light.

Since slits or the like are not used for removal of the side lobe components peculiar to super resolution, the need for alignment of slits, etc. is eliminated.

Furthermore, the use of the polarizing beam splitter ensures efficient utilization of light because incident light is not separated unnecessarily.

DETAILED DESCRIPTION OF THE INVENTION

Embodiment 1

Figure 1:
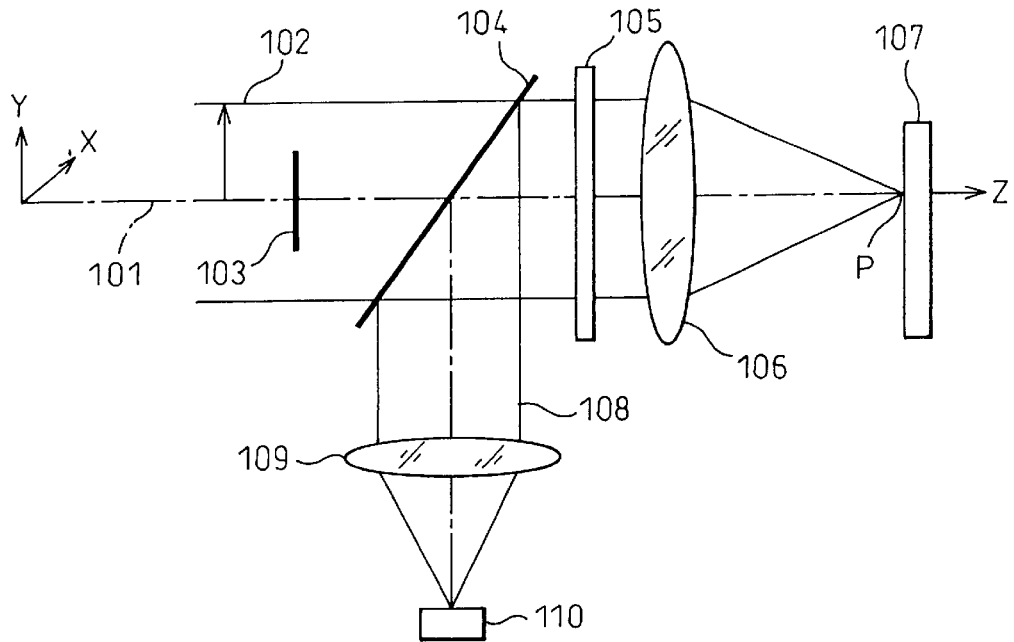
FIG. 1 is a configuration example of an optical device according to a first embodiment of the present invention.

A first embodiment of the present invention will be described with reference to FIG. 1. FIG. 1 shows a cross-sectional view of an optical device, but it should be noted that the actual optical device has a shape that is rotationally symmetrical about its optical axis 101. In the example of FIG. 1, the present invention is applied to an optical disk pickup.

The linearly polarized light 102 is a beam of light emitted from a laser light source such as a semiconductor laser, not shown, and is made substantially parallel by a collimator lens or the like. It is assumed here that the linearly polarized light 102 has a polarization direction which coincides with the Y-axis direction shown in FIG. 1. The linearly polarized light 102 is partially blocked by a circularly shaped blocking mask 103 centered about the optical axis 101, and enters a polarizing beam splitter 104. It is assumed here that the polarizing beam splitter 104 is constructed and oriented so as to selectively pass the linearly polarized light whose polarization direction coincides with the Y-axis direction and reflect the linearly polarized light whose polarization direction coincides with the X-axis direction which is perpendicular to the Y-axis direction. Accordingly, the linearly polarized light 102 entering the polarizing.beam splitter 104 is passed therethrough and enters a quarter-wave plate 105.

The quarter-wave plate 105 converts the linearly polarized incident light into circularly polarized light rotating right-handedly or left-handedly about the propagation direction of the light, depending on the orientation of the quarter-wave plate 105 relative to the orientation of the linearly polarized incident light. In the illustrated example, the quarter-wave plate 105 is oriented so as to convert linearly polarized light whose polarization direction coincides with the Y-axis direction into right-handed polarized light and linearly polarized light whose polarization direction coincides with the X-axis direction into left-handed polarized light. Accordingly, the linearly polarized light 102 entering the quarter-wave plate 105 is converted into right-handed polarized light which enters a first converging lens 106.

The right-handed polarized light beam entering the first converging lens 106 is focused as a super-resolution optical spot, as previously described, at the focal point of the first converging lens 106. The super-resolution optical spot has a main lobe and side lobes, as earlier described, the side lobes being reversed in phase relative to the main lobe. As a result, in the illustrated example, the main lobe is a beam of right-handed circularly polarized light and the side lobes are beams of left-handed circularly polarized light.

In the optical device of FIG. 1, the surface of an optical disk 107 is illuminated with the super-resolution spot, and data stored on the optical disk 107 is read from the reflected light. In this case, since the super-resolution optical spot illuminating the optical disk contains side lobes, as described above, the reflected light of each side lobe becomes a noise component and interferes with the data read from the optical disk 107.

The light striking the optical disk 107 is reflected by the optical disk 107; in this case, it is known that the phase of the light is shifted by a half wavelength on reflection. More specifically, right-handed circularly polarized light is reflected as left-handed circularly polarized light, and left-handed circularly polarized light is reflected as right-handed circularly polarized light. If the reflecting member is constructed with a special material, such as a phase conjugate device, the phase of the light may not be shifted by a half wavelength, but an optical disk whose reflective surface is made of such a material is virtually unthinkable.

In the illustrated example, since the main lobe of the super-resolution optical spot formed on the reflective surface of the optical disk 107 is right-handed circularly polarized light, it is converted into left-handed circularly polarized light on reflection. Likewise, since the side lobes of the super-resolution optical spot formed on the reflective surface of the optical disk 107 are left-handed circularly polarized light, they are converted into right-handed circularly polarized light on reflection.

The light reflected by the reflective surface of the optical disk 107 is again passed through the first converging lens 106 this time in the backward direction, and enters the quarter-wave plate 105. At this time, the reflected light of the main lobe of the super-resolution optical spot converted into left-handed circularly polarized light on reflection is converted by the quarter-wave plate 105 into linearly polarized light whose polarization direction coincides with the X-axis direction. Likewise, the reflected light of the side lobes of the super-resolution optical spot converted into right-handed circularly polarized light on reflection is converted by the quarter-wave plate 105 into linearly polarized light whose polarization direction coincides with the Y-axis direction.

Next, the reflected light enters the polarizing beam splitter 104. As earlier described, the polarizing beam splitter 104 is constructed and oriented so as to selectively pass linearly polarized light whose polarization direction coincides with the Y-axis direction and reflect linearly polarized light whose polarization direction coincides with the X-axis direction which is perpendicular to the Y-axis direction. In the illustrated example, the reflected light of the main lobe of the super-resolution optical spot, which has been converted by the quarter-wave plate 105 into the linearly polarized light whose polarization direction coincides with the X-axis direction, is reflected by the polarizing beam splitter 104 and is thus separated as a light beam 108. On the other hand, the reflected light of the side lobes of the super-resolution optical spot, which has been converted by the quarter-wave plate 105 into the linearly polarized light whose polarization direction coincides with the Y-axis direction, is passed through the polarizing beam splitter 104. As a result, only the reflected light of the main lobe of the super-resolution optical spot, separated as the light beam 108, enters a second converging lens 109. The separated light beam 108 entering the second converging lens 109 is focused on a light detector 110 which thus detects the data read from the optical disk 107.

If the side lobes of the super-resolution optical spot strike pits other than the intended pit on the optical disk 107, reflected beams from such other pits are passed through the polarizing beam splitter 104 and, therefore, do not enter the light detector 110, thus eliminating noise components from the readout data. Furthermore, since the polarizing beam splitter 104 is used rather than an ordinary beam splitter which tends to unnecessarily separate part of the incident light, unnecessary light is not separated and the light can thus be utilized efficiently.

The first embodiment has been described as using a circularly shaped light-blocking plate as the blocking mask 103 but, instead, a rectangular light-blocking plate can be used. For example, if a rectangular blocking mask is used that blocks all regions along the Y-direction of the beam, it is known that first order super resolution occurs only in the X-axis direction. In the first embodiment, the blocking mask 103 has been shown as being arranged in front of the polarizing beam splitter 104, but basically it may be disposed anywhere in the path of the light that is converged by the first converging lens 106. For example, it may be disposed between the polarizing beam splitter 104 and the quarter-wave plate 105, or between the quarter-wave plate 105 and the first converging lens 106, or even directly behind the first converging lens 106.

Further, in the first embodiment, the linearly polarized light entering the polarizing beam splitter 104 has been described as a beam of light whose polarization direction coincides with the Y-axis direction, but alternatively, it may be a beam of light polarized in the X-axis direction. In that case, however, the polarizing beam splitter 104 and the quarter-wave plate must be arranged so that the reflected beams of the side lobes will not be detected by the light detector.

Embodiment 2

Figure 2:
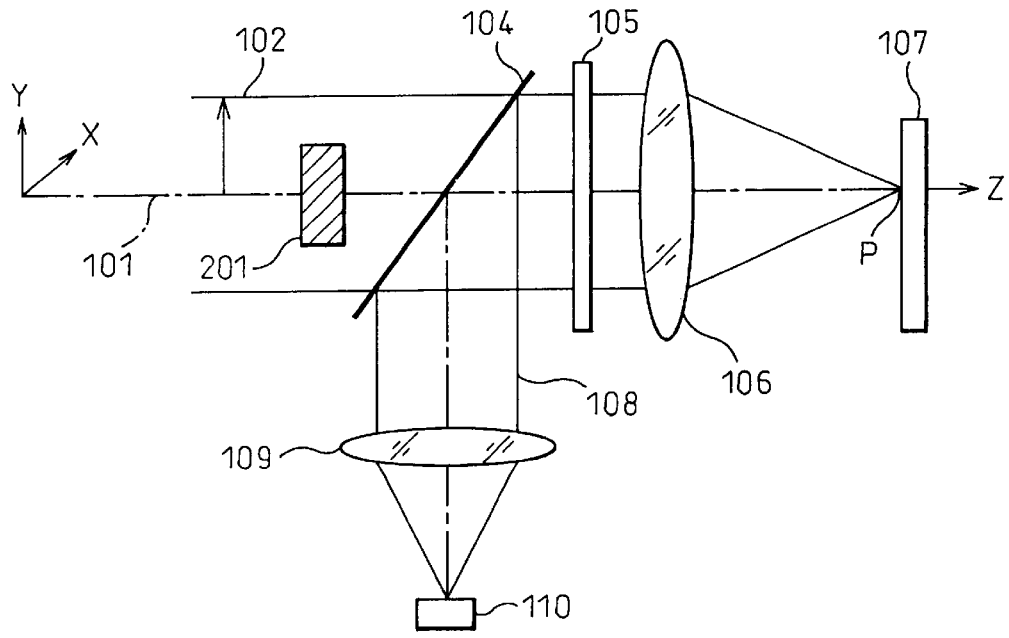
FIG. 2 is a configuration example of an optical device according to a second embodiment of the present invention.

A second embodiment of the present invention will be described with reference to FIG. 2. FIG. 2 shows a cross-sectional view of an optical device, but it should be noted that the actual optical device has a shape that is rotationally symmetrical about its optical axis 101. In the example of FIG. 2, the present invention is applied to an optical disk pickup. The second embodiment differs from the first embodiment in that the blocking mask 103 in the first embodiment is replaced by a half-wave phase shift mask 201. In FIG. 2, the same components as those in the first embodiment are designated by the same reference numerals.

The linearly polarized light 102 is a beam of light emitted from a laser light source such as a semiconductor laser not shown, and is made substantially parallel by a collimator lens or the like. It is assumed here that the linearly polarized light 102 has a polarization direction which coincides with the Y-axis direction shown in FIG. 2. The linearly polarized light 102 is partially blocked by the circularly shaped half-wave phase shift mask 201 centered about the optical axis 101, and enters the polarization beam splitter 104.

The half-wave phase s shift mask 201 has the function of shifting the phase of the beam passing therethrough by a half wavelength, thus reversing the phase of the beam. In this case also, a super-resolution optical spot similar to the one formed when the blocking mask was used is formed at the focal point P of the converging lens 106.

The linearly polarized light 102 entering the polarizing beam splitter 104 is passed therethrough and enters the quarter-wave plate 105. Since the portion of the light passed through the half-wave phase shift mask 201 is shifted in phase by a half wavelength relative to the other portion of the light, a super-resolution optical spot, similar to the one formed when the blocking mask was used, is formed at the focal point P of the converging lens 106.

Next, the light passed through the polarizing beam splitter 104 enters the quarter-wave plate 105. The linearly polarized light 102 entering the quarter-wave plate 105 is converted into right-handed polarized light and enters the first converging lens 106.

The right-handed polarized light beam entering the first converging lens 106 is focused as a super-resolution optical spot, as previously described, at the focal point of the first converging lens 106. The super-resolution optical spot has a main lobe and side lobes, as earlier described, the side lobes being reversed in phase relative to the main lobe. As a result, in the illustrated example, the main lobe is a beam of right-handed circularly polarized light and the side lobes are beams of left-handed circularly polarized light.

In the illustrated example, as the main lobe of the super-resolution spot formed on the reflective surface of the optical disk 107 is right-handed circularly polarized light, it is converted into left-handed circularly polarized light on reflection. Likewise, since the side lobes of the super-resolution spot formed on the reflective surface of the optical disk 107 are left-handed circularly polarized light, they are converted into right-handed circularly polarized light on reflection.

The light reflected by the reflective surface of the optical disk 107 is again passed through the first converging lens 106 this time in the backward direction, and enters the quarter-wave plate 105. At this time, the reflected light of the main lobe of the super-resolution optical spot converted into left-handed circularly polarized light on reflection is converted by the quarter-wave plate 105 into linearly polarized light whose orientation direction coincides with the X-axis direction. Likewise, the reflected light of the side lobes of the super-resolution optical spot converted into right-handed circularly polarized light on reflection is converted by the quarter-wave plate 105 into linearly polarized light whose polarization direction coincides with the Y-axis direction.

Next, the reflected light enters the polarizing beam splitter 104. As earlier described, the reflected light of the main lobe of the super-resolution optical spot, which has been converted by the quarter-wave plate 105 into the linearly polarized light whose polarization direction coincides with the X-axis direction, is reflected by the polarizing beam splitter 104 and thus separated as a light beam 108. On the other hand, the reflected light of the side lobes of the super-resolution optical spot, which has been converted by the quarter-wave plate 105 into the linearly polarized light whose polarization direction coincides with the Y-axis direction, is passed through the polarizing beam splitter 104. As a result, only the reflected light of the main lobe of the super-resolution optical spot, separated as the light beam 108, enters the second converging lens 109. The separated light beam 108 entering the second converging lens 109 is focused on the light detector 110 which thus detects the data read from the optical disk 107.

As described above, in the second embodiment, as in the first embodiment, if the side lobes of the super-resolution optical spot strike pits other than the intended pit on the optical disk 107, reflected beams from such other pits are passed through the polarizing beam splitter 104 and, therefore, do not enter the light detector 110. As a result, reflected beams caused by the side lobes do not introduce noise into the readout data. Furthermore, since the polarizing beam splitter 104 is used rather than an ordinary beam splitter which tends to unnecessarily separate part of the incident light, unnecessary light is not separated and the light can thus be utilized efficiently.

Embodiment 3

Figure 3:
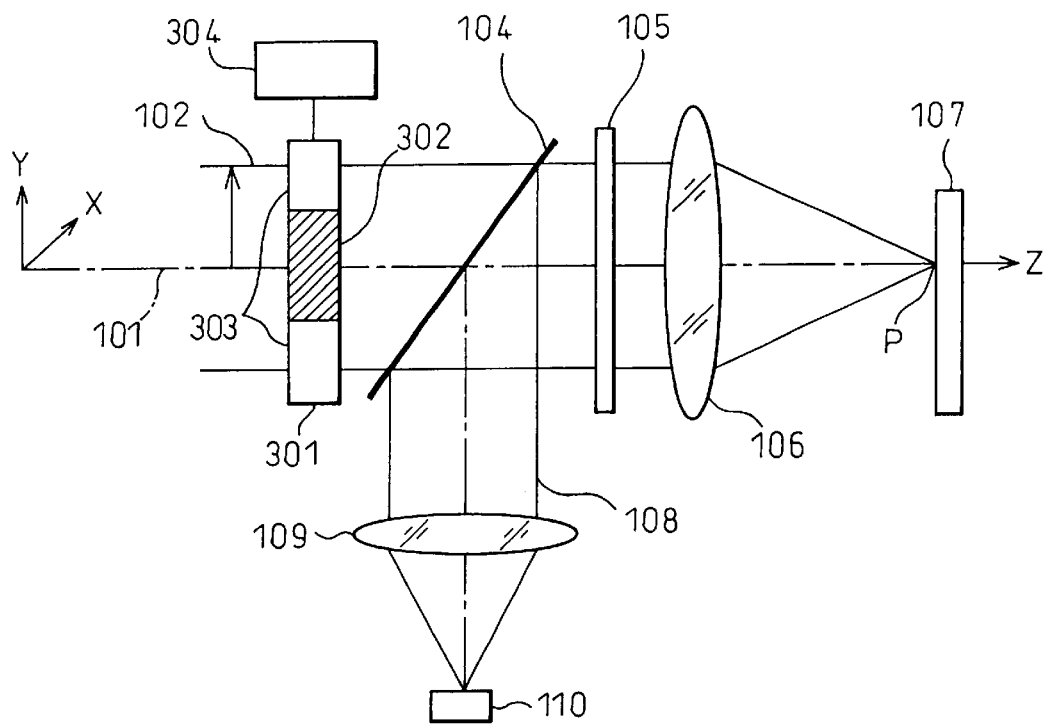
FIG. 3 is a configuration example of an optical device according to a third embodiment of the present invention.
Figure 4:
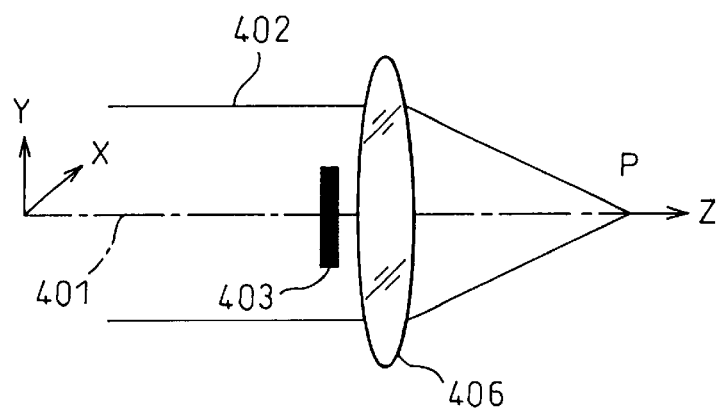
FIG. 4 is a schematic diagram of an optical device for explaining the principle of super resolution.

A third embodiment of the present invention will be described with reference to FIG. 3. FIG. 3 shows a cross-sectional view of an optical device, but it should be noted that the actual optical device has a shape that is rotationally symmetrical about its optical axis 101. In the example of FIG. 3, the present invention is applied to an optical disk pickup. The third embodiment differs from the first embodiment in that the blocking mask 103 in the first embodiment is replaced by an optically active device 301. In FIG. 3, the same components as those in the first embodiment are designated by the same reference numerals.

The linearly polarized light 102 is a beam of light emitted from a laser light source such as a semiconductor laser, not shown, and is made substantially parallel by a collimator lens or the like. It is assumed here that the linearly polarized light 102 has a polarization direction which coincides with the Y-axis direction shown in FIG. 3. The linearly polarized light 102 enters the optically active device 301 centered about the optical axis 101.

The optically active device 301 comprises a circularly shaped 90-degree twisted nematic liquid crystal element portion 302 and an annularly shaped homogeneous-type liquid crystal element portion 303 disposed around the periphery of the 90-degree twisted nematic liquid crystal element portion 302. The liquid crystal element portions 302 and 303 are both sandwiched between transparent glass substrates. Here, the glass substrates sandwiching the 90-degree twisted nematic liquid crystal element portion 302 therebetween are coated with transparent electrodes, and the transparent electrodes are connected to a power supply 304.

In the 90-degree twisted nematic liquid crystal element portion 302, when no voltage is applied from the power supply 304, the director of the liquid crystal on the entrance-side glass substrate lies parallel to the Y-axis direction, but the director of the liquid crystal on the exit-side glass substrate lies parallel to the X-axis direction. When voltage is applied from the power supply 304, the director of the liquid crystal in the 90-degree twisted nematic liquid crystal element portion 302 changes so as to always point in the Y-axis direction.

In the homogeneous-type liquid crystal element portion 303, the director of the entire liquid crystal always points in the Y-axis direction.

Accordingly, with no voltage is applied from the power supply 304, when the linearly polarized light 102 oriented in the Y-axis direction enters the optically active device, the light passed through the 90-degree twisted nematic liquid crystal element portion 312 emerges as linearly polarized light with its polarization axis rotated 90 degrees relative to the light passed through the other portion, that is with its polarization axis pointing in the X-axis direction. When voltage is applied from the power supply 304, the linearly polarized light 102 entering the optically active device emerges unchanged because the 90-degree twisted nematic liquid crystal element portion 302 then does not have the function of rotating the polarization axis.

When no voltage is applied from the power supply 304, since the light passed through the 90-degree twisted nematic liquid crystal element portion 302 of the optically active device 301 is linearly polarized light whose polarization direction coincides with the X-axis direction, the light is reflected by the polarizing beam splitter 104 and does not reach the first converging lens 106. That is, in the third embodiment, the linearly polarized light 102 behaves as if it were blocked by a blocking mask having the same shape as that of the 90-degree twisted nematic liquid crystal element portion 302 of the optically active device 301. Therefore, as in the first embodiment, a super-resolution optical spot is formed at point P. The super-resolution optical spot has a main lobe and side lobes, as earlier described. However, if the reflected light is generated due to the side lobes of the super-resolution optical spot, such reflected light is not directed to the light detector 110 but is passed through the polarizing beam splitter 104, so that the side lobes do not present the problem of noise being introduced to the readout data.

Figure 5:
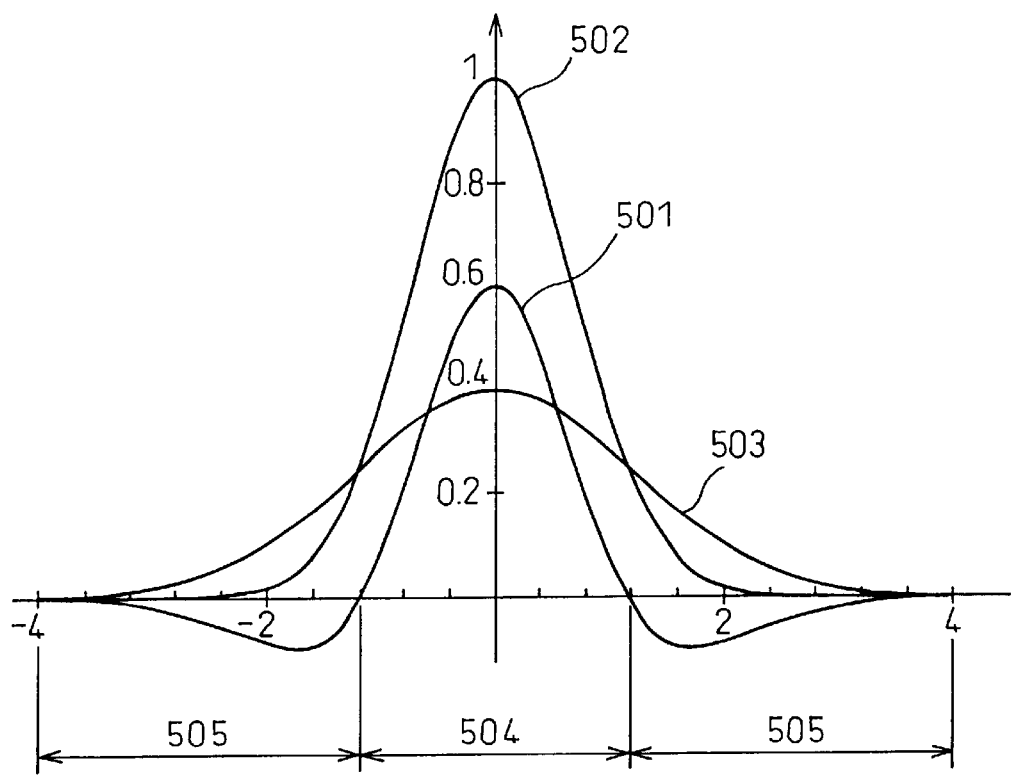
FIG. 5 is a diagram for explaining an optical spot formed by super resolution.

On the other hand, when voltage is applied from the power supply 304, no super-resolution spot is formed at point P, but an ordinary optical spot such as the one shown at 502 in FIG. 5 is formed.

Therefore, when reading a compact disc (CD), a semiconductor laser of 780 nm is used as the light source, and an ordinary optical spot is formed by applying a voltage to the optically active device 301 from the power supply 304. Using the same light source, a digital video disc (DVD) which has smaller pits than the CD can be read by forming a super-resolution spot by not applying a voltage to the optically active device 301 from the power supply 304. Here, when reading the CD and DVD, a single lens compatible with both the CD and DVD may be used as the first converging lens 106, or alternatively, a known CD pickup converging lens and a known DVD pickup converging lens may be used by mechanically switching between them.

In this way, by using the optically active device and thereby making it possible to choose whether to form or not to form a super-resolution optical spot, different kinds of optical disks can be read.

It is also possible to use, in place of the optically active device of the present embodiment, a half-wave plate having a function similar to that of the optically active device.

What is claimed is:

1. An optical device used for reading an optical disk, comprising:
   blocking means for blocking a portion of a first linearly polarized light;
   a polarizing beam splitter for transmitting said first linearly polarized light therethrough, and for reflecting a second linearly polarized light whose plane is oriented at right angles relative to said first linearly polarized light;
   a quarter-wave plate for converting said first linearly polarized light into first circularly polarized light and said first circularly polarized light into said first linearly polarized light, while converting a second circularly polarized light, whose plane is rotating in a direction opposite to said first circularly polarized light, into said second linearly polarized light;
   a first converging lens for forming an optical spot on said optical disk, and for allowing reflected light caused by said optical spot by reflection from said optical disk to pass therethrough in a backward direction; and
   a second converging lens for focusing a beam of light reflected by said polarizing beam splitter onto a light detector,
   wherein said optical spot comprises a main lobe of said first circularly polarized light and a side lobe of said second circularly polarized light, and said reflected light comprises reflected light having said second circular polarization caused by said main lobe and reflected light having said first circular polarization caused by said side lobe.

2. An optical device as claimed in claim 1, wherein said quarter-wave plate converts the reflected light of said main lobe into said second linearly polarized light and the reflected light of said side lobe into said first linearly polarized light.

3. An optical device as claimed in claim 2, wherein said second converging lens focuses on said light detector the reflected light of said main lobe having said second linear polarization reflected by said polarizing beam splitter.

4. An optical device as claimed in claim 1, wherein said blocking means is disposed between said optical spot forming lens and said polarizing beam splitter.

5. An optical device used for reading an optical disk, comprising:
   a half-wave phase shift mask for shifting the phase of a portion of first linearly polarized light by a half wavelength;
   a polarizing beam splitter for transmitting said first linearly polarized light therethrough, and for reflecting a second linearly polarized light;
   a quarter-wave plate for converting said first linearly polarized light into first circularly polarized light and said first circularly polarized light into said first linearly polarized light, while converting a second circularly polarized light, whose plane is rotating in a direction opposite to said first circularly polarized light, into said second linearly polarized light;
   a first converging lens for forming an optical spot on said optical disk, and for allowing reflected light caused by said optical spot by reflection from said optical disk to pass therethrough in a backward direction; and
   a second converging lens for focusing a beam of light reflected by said polarizing beam splitter onto a light detector,
   wherein said optical spot comprises a main lobe of said first circularly polarized light and a side lobe of said second circularly polarized light, and said reflected light comprises reflected light having said second circular polarization caused by said main lobe and reflected light having said first circular polarization caused by said side lobe.

6. An optical device as claimed in claim 5, wherein said quarter-wave plate converts the reflected light of said main lobe into said second linearly polarized light and the reflected light of said side lobe into said first linearly polarized light.

7. An optical device as claimed in claim 6, wherein said second converging lens focuses on said light detector the reflected light of said main lobe having said second linear polarization reflected by said polarizing beam splitter.

8. An optical device as claimed in claim 5, wherein said half-wave phase shift mask is disposed between said optical spot forming lens and said polarizing beam splitter.

9. An optical device used for reading an optical disk, comprising:

an optically active device having a 90-degree twisted nematic liquid crystal element for converting a portion of first linearly polarized light into second linearly polarized light whose plane is oriented at right angles relative to said first linearly polarized light;

a polarizing beam splitter for transmitting said first linearly polarized light therethrough, and for reflecting said second linearly polarized light;

a quarter-wave plate for converting said first linearly polarized light into first circularly polarized light and said first circularly polarized light into said first linearly polarized light, while converting a second circularly polarized light, whose plane is rotating in a direction opposite to said first circularly polarized light, into said second linearly polarized light;

a first converging lens for forming an optical spot on said optical disk, and for allowing reflected light caused by said optical spot by reflection from said optical disk to pass therethrough in a backward direction; and a second converging lens for focusing a beam of light reflected by said polarizing beam splitter onto a light detector, wherein said optical spot comprises a main lobe of said first circularly polarized light and a side lobe of said second circularly polarized light, and said reflected light comprises reflected light having said second circular polarization caused by said main lobe and reflected light having said first circular polarization caused by said side lobe.

10. An optical device as claimed in claim 9, wherein said quarter-wave plate converts the reflected light of said main lobe into said second linearly polarized light and the reflected light of said side lobe into said first linearly polarized light.

11. An optical device as claimed in claim 10, wherein said second converging lens focuses on said light detector the reflected light of said main lobe having said second linear polarization reflected by said polarizing beam splitter.

12. An optical device as claimed in claim 9, wherein said optically active device is disposed between said optical spot forming lens and said polarizing beam splitter.

13. An optical device as claimed in claim 9, wherein said optically active device is capable of electrically enabling and disabling the function of converting said first linearly polarized light into said second linearly polarized light.

14. An optical device as claimed in claim 13, wherein different kinds of optical disks are read by enabling and disabling said function of said optically active device.

15. An optical device as claimed in claim 14, wherein said different kinds of optical disks are a DVD and a CD, respectively.

* * * * *